(12) United States Patent
Thomas et al.

(10) Patent No.: US 7,025,314 B1
(45) Date of Patent: Apr. 11, 2006

(54) MULTI-FUNCTIONAL MOUNTING BRACKET WITH INTEGRAL ELECTRICAL BOX

(76) Inventors: Tammy Thomas, 1293 Lake Trace Cove, Hoover, AL (US) 35244; Thomas Herren, 520 Caryonah Rd., Crossville, TN (US) 38571

( * ) Notice: Subject to any disclaimer, the term of this patent is extended or adjusted under 35 U.S.C. 154(b) by 130 days.

(21) Appl. No.: 10/841,732

(22) Filed: May 8, 2004

(51) Int. Cl.
*A47B 96/08* (2006.01)

(52) U.S. Cl. .................... 248/205.1; 220/3.9; 248/544; 248/906

(58) Field of Classification Search ............ 248/205.1, 248/544, 906; 174/58, 50; 220/3.3, 3.6, 220/3.9; 52/317
See application file for complete search history.

(56) References Cited

U.S. PATENT DOCUMENTS

| | | | |
|---|---|---|---|
| 4,050,603 A | 9/1977 | Harris et al. |
| 4,180,226 A | 12/1979 | Matte |
| 4,572,391 A | 2/1986 | Medlin |
| 4,576,431 A | 3/1986 | Thayer |
| 4,688,693 A | 8/1987 | Medlin |
| 4,723,746 A | 2/1988 | Gould et al. |
| 4,747,506 A | 5/1988 | Stuchlik, III |
| 4,964,525 A | 10/1990 | Coffey et al. |
| 4,967,990 A | 11/1990 | Rinderer |
| 5,004,199 A | 4/1991 | Suk |
| 5,189,857 A | 3/1993 | Herren et al. |
| 5,295,644 A | 3/1994 | Ferguson |
| 5,330,137 A | 7/1994 | Oliva |
| 5,405,111 A | 4/1995 | Medlin, Jr. |
| 5,423,499 A | 6/1995 | Webb |
| 5,595,362 A | 1/1997 | Rinderer |
| 5,646,371 A | 7/1997 | Fabian |
| 5,931,425 A | 8/1999 | Oliva |
| 6,098,945 A | 8/2000 | Korcz |
| 6,260,318 B1 | 7/2001 | Herren |
| 6,332,597 B1 | 12/2001 | Korcz et al. |
| 6,384,334 B1 | 5/2002 | Webb |
| 6,484,979 B1 | 11/2002 | Medlin |
| 6,595,479 B1 | 7/2003 | Johnson et al. |
| 6,666,419 B1 | 12/2003 | Vrame |
| 2005/0067546 A1 * | 3/2005 | Dinh ..................... 248/343 |

* cited by examiner

*Primary Examiner*—Ramon O Ramirez
(74) *Attorney, Agent, or Firm*—Bradley, Arant, Rose & White, LLP

(57) ABSTRACT

The present disclosure describes a multi-functional mounting bracket. The mounting bracket described comprises an integral electrical box obviating the need to mount the electrical box to the mounting bracket at the construction site. Furthermore, the mounting bracket as described can be attached to metal or wooden studs without the need for modification of the mounting bracket. The bracket provides for a simple, efficient installation of electrical boxes, ensuring that the electrical box is installed in the proper configuration.

35 Claims, 5 Drawing Sheets

MULTI-FUNCTIONAL MOUNTING BRACKET WITH INTEGRAL ELECTRICAL BOX

FIELD OF THE DISCLOSURE

The present disclosure relates to wall construction, and more particularly to a new and improved device for mounting and supporting electrical boxes between supports, such as studs, within wall structures.

BACKGROUND

All building, both commercial and residential, generally require an input of a variety of electrical lines, phone lines, cable lines, and similar items during construction. These items are collectively referred to in this disclosure as "utilities". Generally, the utilities are enclosed within the wall of the building. The utilities enter the building at various points and end at a point of delivery such that the utility can be connected to an article and used for its intended purpose. The utilities may be enclosed in a conduit, such as pipes, tubes, ducts and the like (collectively referred to in this disclosure as "conduits") The point of delivery into the structure is frequently an electrical box or other similar device (all of which are collectively referred to in this disclosure as an "electrical box") which receives the utility and mates the utility to an article allowing the use of the utility. For instance, the utility may be an electrical utility (i.e., an electrical wire or cable) and the article may be an electrical outlet or a light switch (the article may also comprise accessory items for installations such as a face cover or plate). The electrical box is generally installed in the interior of a wall and may be secured to a stud or other support within the wall.

The building codes describe a variety of restrictions for the delivery of the utility. For instance, in the case of an electrical utility, the conduit carrying the utility and the electrical box receiving the electrical utility must be secured to a structural component of the structure. The prior art has accomplished this by securing the electrical box directly to a stud or other support (which may severely limit the positioning of the electrical box) or through the use of a variety of electrical box support devices. The electrical utility itself is also required to be secured to a support within a certain distance from the electrical box.

Support systems for electrical boxes are known in the art. Many of the prior art electrical box supports secure the electrical box to a single stud or other support and incorporate a leg member of similar structure which extends from the side of the electrical box opposite the attachment to the support and contacts the wall panel behind the electrical box in an attempt to prevent movement of the electrical box. Other prior art devices are secured between a pair of supports within the wall structure and allow the connection of an electrical box to a member spanning the distance between the two supports. Each of these prior art approaches has limitations. First, many of the prior art electrical box supports fail to adequately secure the electrical box in place, allowing the electrical box to move from its original position when the wallboard is installed over the studs or when an article is connected to the electrical box. This may occur if the electrical box is secured to the support in a manner that allows the electrical box to rotate about the point of attachment. Such movement can result in the electrical box and its attached article appearing titled in relation to the floor, ceiling, door/window frames and other structures in or near the wall, creating an aesthetically unattractive appearance. Furthermore, the prior art electrical box supports allow for movement of the electrical box over time as the article connected to the electrical box is used. In addition, many of the prior art electrical box supports require that the electrical box be connected to the support in the field, increasing the time required for the installation. Finally, the prior art electrical box supports serve only 1 purpose: the positioning and supporting of an electrical box at a desired location. Other functions, such as structural support and fire protection are not provided by the prior art electrical box supports. Therefore, the art is lacking a multifunctional mounting bracket containing an integral electrical box that provides for a simple, efficient and aesthetically pleasing finished installation. The present disclosure describes such a multifunctional mounting bracket with an integral electrical box.

DETAILED DESCRIPTION

Figure 1A:
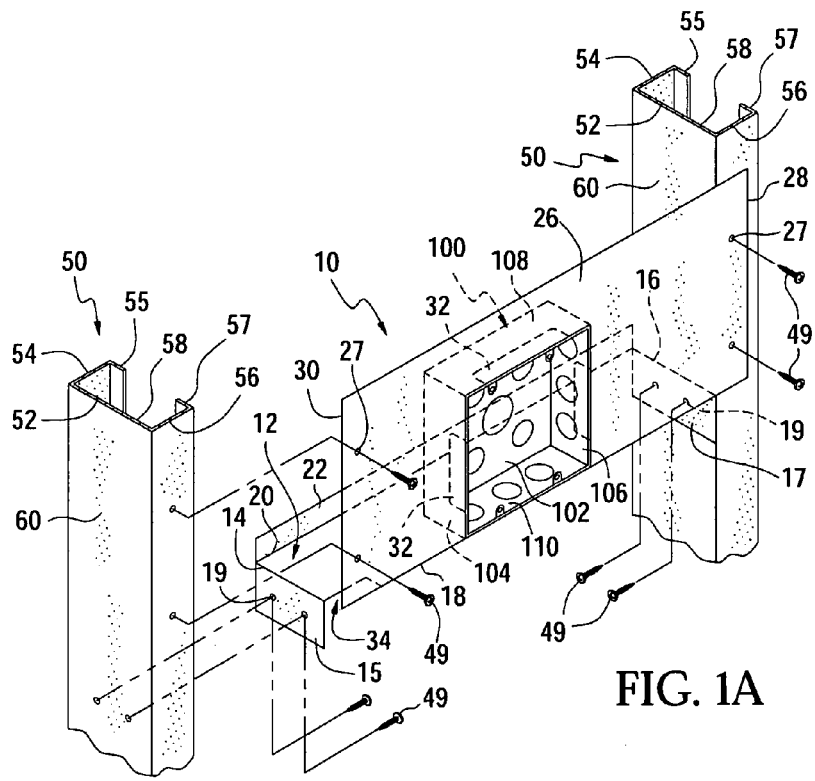
FIG. 1A illustrates one embodiment of the mounting bracket and integral electrical box of the present disclosure secured between two metal studs in a wall structure.
Figure 1B:
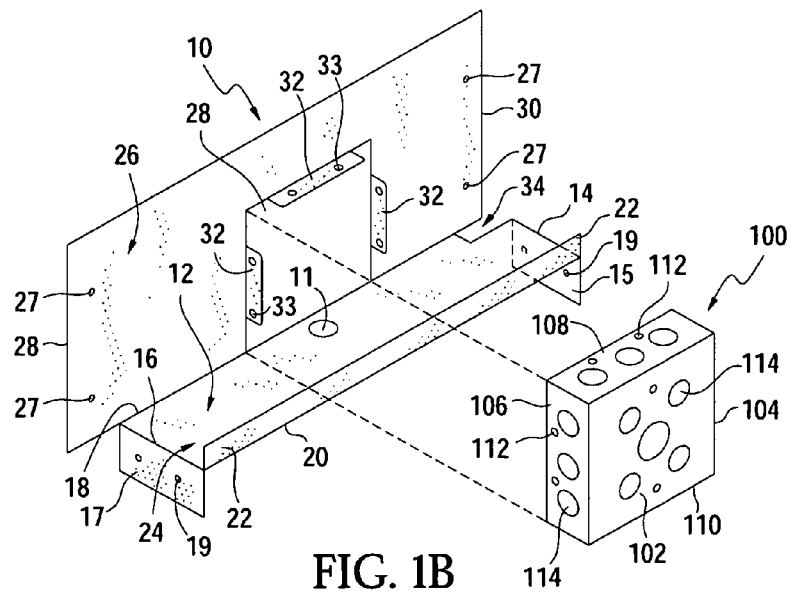
FIG. 1B is a rear view of the embodiment of the mounting bracket and integral electrical box shown in FIG. 1A.

Referring now to the drawings, and particularly to FIGS. 1–4, the mounting bracket is described and illustrated, and generally designated by numeral 10. The mounting bracket comprises an integral electrical box 100, obviating the need for the electrical box to be installed to the mounting bracket 10 at the job site. The mounting bracket 10 also provides support for the utility as it enters the electrical box, preventing the utility from coming into contact with un-intended portions of the mounting bracket 10 and preventing the application of unwanted or unintended stress being applied to the utility that may damage the utility or cause it to become disconnected with the article contained in the electrical box 100. When installed as described herein, the mounting bracket 10 allows a simple and quick installation of an electrical box 100. The design of the mounting bracket 10 ensures that the electrical box 100 is placed in a position such that the bottom edge of the electrical box is parallel with the top/bottom of the wall structure and the ceiling/floor, ensuring an aesthetically pleasing appearance of the finished installation (i.e., the presentation of the article to be connected to the electrical box). Furthermore, the mounting bracket 10 is secured permanently in place as described herein ensuring that the electrical box will not move out of position when an article is installed in the electrical box and further ensuring that the electrical box will not move out of position when the wallboard is applied over the studs to form the finished wall or over time as the article installed in the electrical box is used (for example, the insertion and removal of an electrical plug into an electrical outlet).

In addition to providing a permanent and secure mounting for an electrical box with the advantages discussed above, the present invention provides for other useful features. As will be discussed below, the mounting bracket comprises a one piece front plate 26 to permanently secure the electrical box 100 to the mounting bracket 10. In addition to providing a mounting surface for the electrical box 100 in place, the front plate 26 may serve to provide closure between the studs 50 of the wall structure, thereby forming a fire stop or draft dampener. In addition, the mounting bracket 10 is manufactured from a rigid, high strength material and provides substantial bracing and structural support to the studs and the wall structure itself. Therefore, the mounting bracket described performs multiple functions heretofore not available in one device.

The mounting bracket 10 may be fabricated from any convenient rigid, high strength material, such as plastics, polymers, composites or metals. In one embodiment, the mounting bracket is manufactured from a fire resistant material. In a specific embodiment, the mounting bracket is manufactured from galvanized steel, such as 16, 20 or 24 gauge galvanized steel. The mounting bracket may be manufactured by a variety of techniques well-known in the art. The method of manufacturing the mounting bracket may depend on the material with which the mounting bracket is constructed. In one embodiment where the mounting bracket is manufactured from a metal material, such as galvanized steel, the mounting bracket may be manufactured using a progressive die set in a mechanical press. In an alternate embodiment, where the mounting bracket is manufactured from plastics, polymers or composites, the mounting bracket 10 may be manufactured using injection molding, extrusion casting or similar techniques.

As shown in FIGS. 1–4, the mounting bracket 10 comprises a unitary, elongated base member 12. The base 12 has a length defined by two supports within the wall. In many cases the interior wall supports will be studs 50. The studs 50 may be made of any material, such as wood or metal. In most applications, building codes require that the studs be placed a defined distance from one another. Therefore, the length of the elongated base 12 may be determined by this standard. The length of the elongated base 12 may also be varied to correspond to any distance between any two studs 50 or other supports as might be encountered in certain areas within the wall or in certain unique situations. The elongated base member 12 may have one or more pre-formed holes 11 (see FIG. 1B) therein to allow the passage of utilities from their point of origin to the point of delivery in the wall (i.e., the electrical box). In one embodiment, the pre-formed hole 11 has tapered edges so as not to cut into the utility or the conduit carrying the utility. The pre-formed hole 11 may be of any diameter so long as the diameter does not weaken the structural integrity of the mounting bracket 10. In one embodiment, the hole 11 is aligned with a punchout 114 on the electrical box 100.

Figure 2:
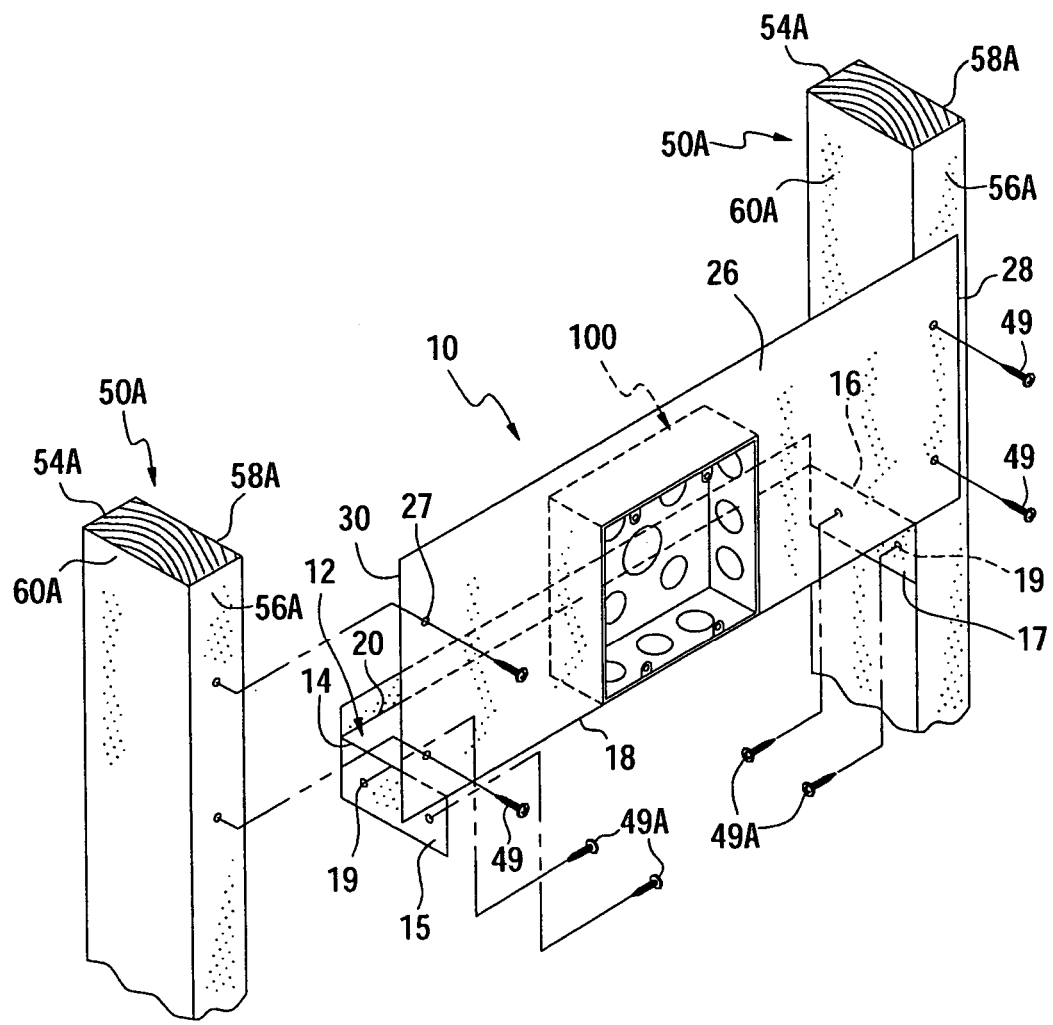
FIG. 2 illustrates an alternate embodiment of the mounting bracket and integral electrical box of the present disclosure secured between two wooden studs in a wall structure.
Figure 3:
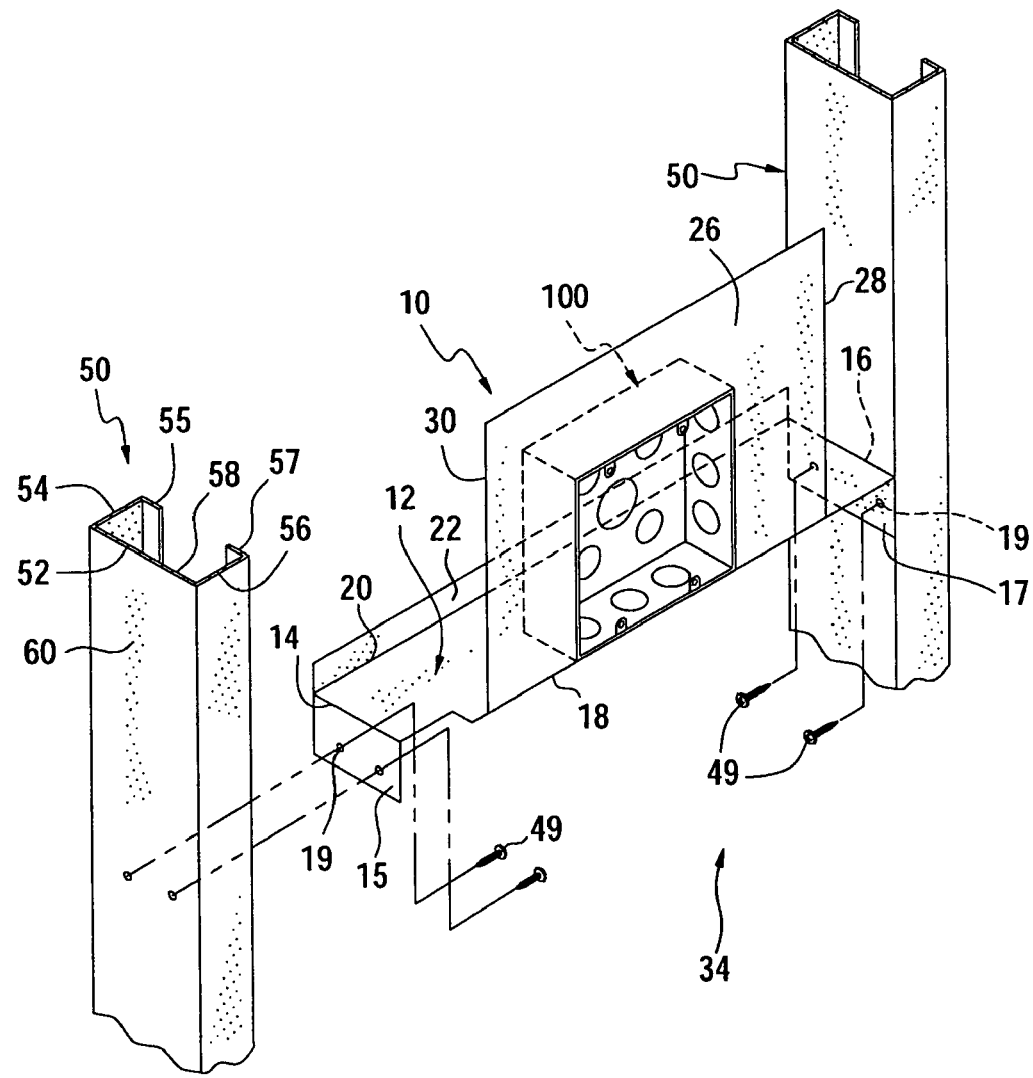
FIG. 3 illustrates an additional embodiment of the mounting bracket and integral electrical box of the present disclosure secured between two metal studs in a wall structure.
Figure 4:
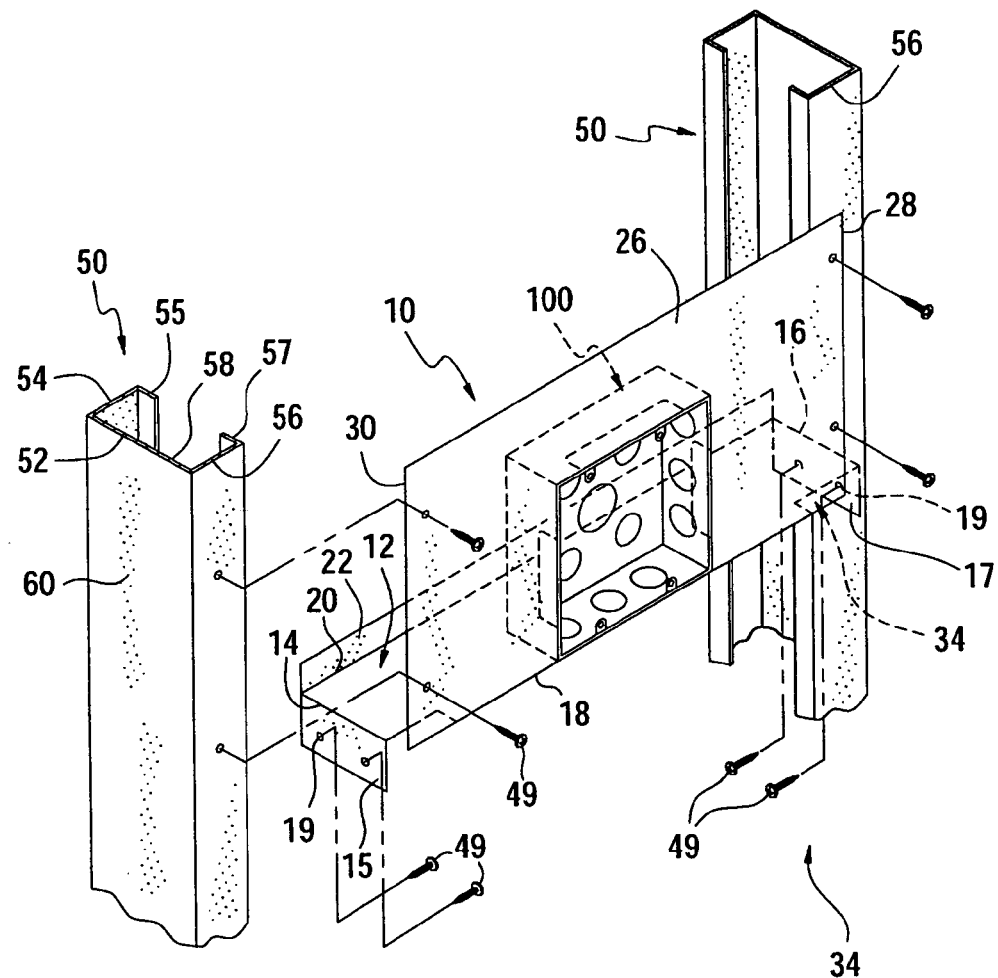
FIG. 4 illustrates yet another embodiment of the mounting bracket and integral electrical box of the present disclosure secured between two metal studs in a wall structure.

The elongated base member 12 terminates in a first end 14 and a second end 16. The elongated base member 12 further comprises a first horizontal edge 18 that defines the front of the elongated base 12 and a second horizontal edge 20 that defines the rear of the elongated base 12. The first 18 and second 20 horizontal edges extend between the first 14 and second 16 ends. A rear flange 22 extends from the second horizontal edge 20 of the elongated base 12. In one embodiment, the rear flange 22 extends upwardly from the elongated base 12 and is generally perpendicular to the elongated base 12. A front plate 26 extends from the first horizontal edge 18 of the elongated base 12. In one embodiment, the front plate 26 upwardly from the elongated base 12 and is generally perpendicular to the elongated base 12. The face plate 26 may have pre-formed holes 27 at convenient locations thereon to aid in securing the face plate to the studs 50 or other structures within the wall. The front plate 26 extends a sufficient distance such that the front plate 26 may be secured to the studs 50 or other supports as shown in FIGS. 1A, 2, and 3. Therefore, in some embodiments the length of the face plate will be determined by the type of stud or other support to which the mounting bracket 10 is attached. For instance, in FIG. 1A, the face plate 26 extends beyond the second end 16 of the elongated base 12 so that the face plate 26 may be secured to the side 56 of the stud 50. In contrast, the face plate 26 does not extend to the end of the first end 14 of the elongated base 12. However, since the side 56 of the stud 50 extends into notch 34 present on the first end 14 of the mounting bracket 10, the face plate 26 may still be secured to the side 56 of the stud 50. As another example, in FIG. 2, the face plate 26 extends beyond the ends 14 and 16 of the elongated base 12 to allow the face plate 26 to be secured to the sides 56 A of the studs 50A (which in this embodiment are wooden studs with a symmetrical form). However, as shown in FIG. 4, the face plate is not required to be secured to the studs 50 and may extend only a slight distance beyond the contours of the electrical box 100. In this embodiment, the electrical box is still firmly secured to the mounting bracket 10 by virtue of the face plate 26.

The front plate 26 provides a stable mounting surface for an electrical box 100. The electrical box 100 may be positioned at any predetermined location on the front plate 26. The electrical box 100 is of standard construction. The electrical box may receive a variety of articles, including, but not limited to, a light switch, a convenience plug, an electrical outlet, a cable outlet, a phone outlet or similar article as may be known in the art (collectively referred to in this disclosure as "articles"). The exact configuration of the electrical box 100 may be varied depending on the article received by the electrical box 100. FIGS. 1–5 show an electrical box 100 as is commonly used to secure an electrical outlet or a light switch. The electrical box may contain a single article or may contain a plurality of articles as is known in the art. In general, the electrical box 100 comprises a back 102, a left side 104, a right side 106, a top portion 108 and a bottom portion 110 each attached to and outwardly extending from the back 102. The electrical box 100 may further comprise one or more of the following: (i) pre-formed holes 112 for receiving a fastener (such as a nail or screw); (ii) pre-formed openings (not shown); and (iii) areas commonly referred to as punch-outs 114 (areas in the back, right side, left side, top and/or bottom portions that can be removed, or punched out, to provide a entry point for the utility).

Figure 5A:
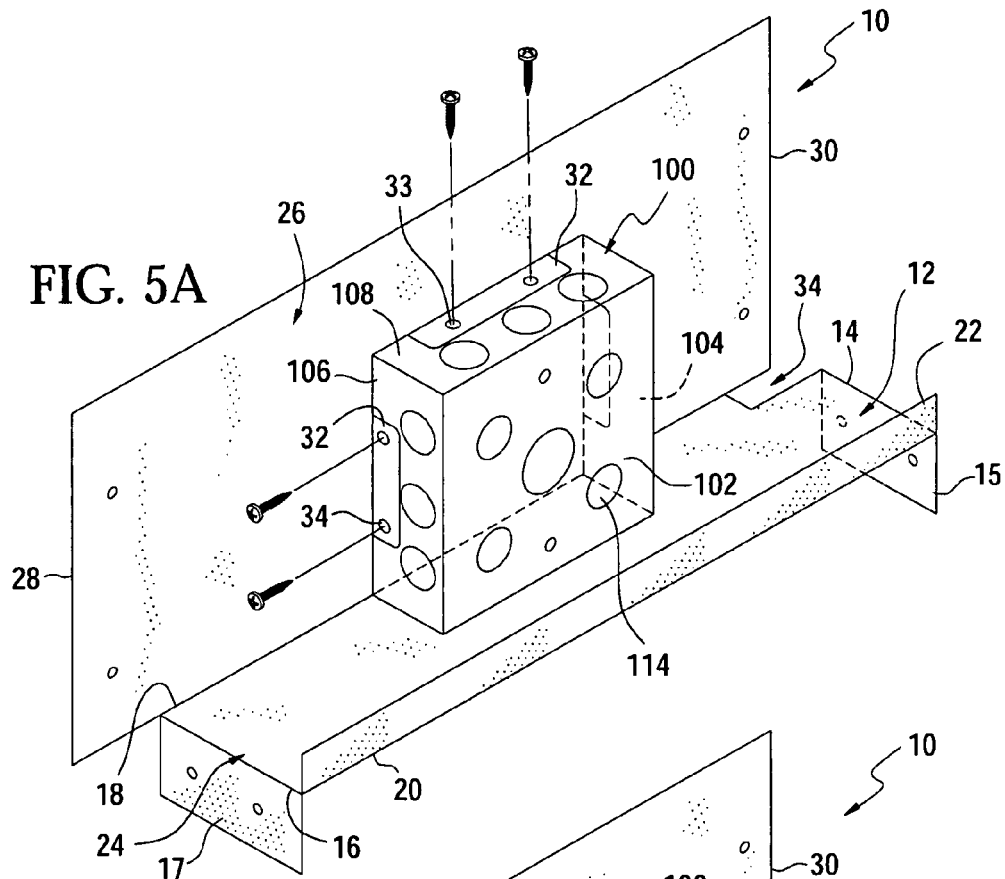
FIG. 5A illustrates one embodiment of the attachment of the electrical box to the mounting bracket.
Figure 5B:
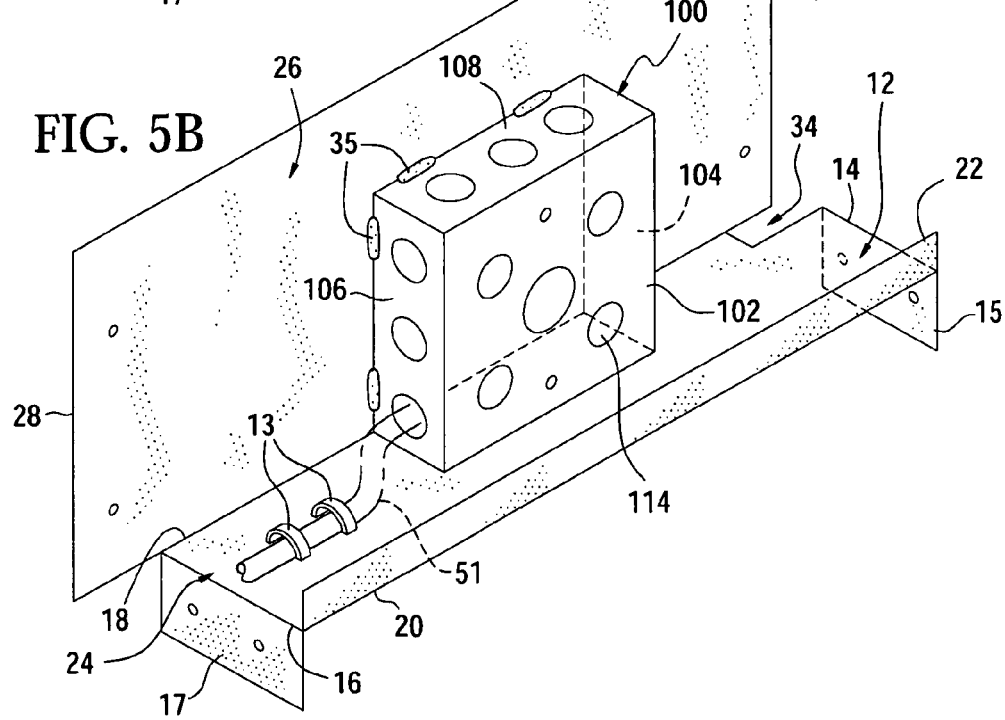
FIG. 5B illustrates an alternate embodiment of the attachment of the electrical box to the mounting bracket.

In one embodiment, the electrical box may be formed as an integral piece of the front plate 26. In an alternate embodiment, the electrical box 100 may be secured in place on front plate 26 by mounting the electrical box in a pre-formed opening 28 (see FIGS. 5A and B) in front plate 26. In the case where the electrical box 100 is mounted in a pre-formed opening 28 in the front plate 26, the front plate 26 may comprise an element to secure the electrical box 100. In FIG. 5A, the element is illustrated as tabs 32 extending from at least one of the sides 29 of the opening 28. The tabs 32 may further comprise pre-formed holes 33 in register with the pre-formed holes 112 in the electrical box 100. In an alternate embodiment, the electrical box may be secured by a weld 35 (either by spot welds or a continuous weld) into the opening 28 or secured by other means known in the art.

The elongated base 12, the rear flange 22 and the front plate 26 define a channel 24. The channel 24 may serve a support for the utility (indicated as 51) to be connected to the electrical box 100. The support provided by the channel 24 may prevent outside forces from acting on the utility. In one embodiment, the elongated base 12 may comprise retention clips 13 to help secure the utility in place.

The first 14 and second 16 ends of the elongated base 12 are secured to the studs 50 or other support. In one embodiment, the first 14 and second 16 ends comprise a first flange 15 on said first end 14 and a second flange 17 on said second end 16. The first flange 15 and the second flange 17 permit the attachment of the mounting bracket 10 to a surface of the studs 50 or other structures within the wall (see FIGS. 1–4 and the discussion below). The first 15 and second 17 flanges may have pre-formed holes 19 to aid in the attachment. As shown in FIG. 1, the first 15 and second 17 flanges are bent at an angle in relation to the elongated base 12. The first 15 and second 17 flanges may be bent upward or downward in relation to the elongated base 12. If the flanges 15 or 17 are bent upward, the may further comprise a channel or opening therein to allow the passage of the utility. In one embodiment the flanges 15 and 17 are generally perpendicular to the elongated base 12 and are bent downward in relation to the elongated base. The lengths of the first 15 and second 17 flanges may be any convenient length, so long as the length is sufficient to provide the attachment to the studs 50 or other structures within the wall. The mounting bracket 10 may be attached to the studs 50 or other support within the wall by any convenient means. In one embodiment, the mounting bracket 10 is attached to the studs 50 or other support within the wall by using a nail gun, screw gun or various other means as is known in the art. In one embodiment, self-tapping screws 49 inserted through the pre-formed holes 19 on the first flange 16 and second flange 17 and into the stud 50 or other support.

At least one of the first end 14 or the second end 16 of the elongated base 12 comprises a parallel notch 34 extending along the horizontal axis of the elongated base 12. In one embodiment, the at least one notch 34 is positioned along the first horizontal edge 18. In an alternate embodiment, the at least one notch 34 is positioned along the second horizontal edge 20. The mounting bracket 10 may comprise more than one notch 34, and when more than one notch is present, the notches 34 may be located at any position described above. Various placements of the notch 34 are described in FIGS. 1–4. Other placements of the notch 34 are possible with the embodiments in FIGS. 1–4 being for the purpose of illustration only. The notch 34 functions to accommodate the sides and/lip of a metal stud as described below. The width and length of the notches 34 is variable depending upon the size of the lips incorporated into the studs 50. The parallel notches 34 are formed from the first end 12 along the horizontal axis of the metal elongated plate like member prior to forming the first flange 15 and the second flange 17. In one embodiment, the notch 34 is ½ of an inch wide and 2 inches long and positioned along the first horizontal edge 18 of the elongated base 12. The presence of the notch 34, and therefore the configuration of an end of the mounting bracket 10, may depend on the type of stud or other support to which the mounting bracket 10 is attached (as shown in a comparison of FIG. 1A and FIG. 2). Generally, when attaching to a metal stud or similar support, a notch 34 is required on at least one end of the mounting bracket 10.

The mounting bracket 10 is designed to be secured between a pair of supports located within and define the structure of a wall. As discussed above, in many cases the supporting structures will be a pair of studs. The studs may be formed from a variety of materials, but studs formed from wood or metal, such as galvanized steel, are commonly used.

FIG. 1A illustrates the placement of the mounting bracket 10 between two adjacent upright metal studs 50 in a building, typically at uniform spaced intervals as dictated by building codes (such as on 16 or 24 inch centers). In this embodiment, the mounting bracket 10 is formed from 16, 20 or 24 gauge galvanized steel. Each of the metal studs 50 is formed of a single sheet of galvanized steel bent into a U-shaped or channel shaped cross sectional configuration so that each stud is formed with a relatively broad base 52 and narrower sides 54 and 56. The sides 54 and 56 are of a uniform height throughout. For example, the sides 54 and 56 may be two inches in height while the base 52 may be four inches in width. The base 52 has a front surface 58 and a back surface 60. The sides 54 and 56 are bent at right angles relative to the base 52 and extend outwardly from the front surface 58 of the base 52 parallel to each other and at right angles to the base 52. For additional structural rigidity the edges of the sides 54 and 56 may be bent over to form lips 55 and 57, which reside in mutual coplanar relationship in the same plane as the base 52 and extend from the sides toward each other a distance typically between about one eighth of an inch and one half of an inch.

The studs 50 are all mounted in uniform alignment with the front surfaces 58 of the stud bases 52 all facing in one direction. The studs 50 are all of a uniform width (the standard for which is 4 inches or 3⅝inches. The sides 54 and 56 of the studs 50, and all other studs in the wall all reside in coplanar relationship and are parallel to the building wall in which the studs 50 are mounted.

The mounting bracket 10 spans the distance between the back surface 60 of the base 52 of one stud 50 and the front surface 58 of the base 52 of the other stud 50. As shown in FIG. 1A, the second end 16 abuts the back surface 60 of stud 50 so that the second flange 17 is in contact with the back surface 60 and the first end 16 abuts the front surface 58 of the base 52 of stud 50 such that the first flange 15 is in contact with the front surface 58. The first 15 and second 17 flanges are then secured to the studs 50 as described, such as by using a nail gun, screw gun or various other means as is known in the art (such as with self-tapping screws 49). As shown in FIG. 1A, lip 57 and side 56 extend into notch 34 on the elongated base 12 so that the first flange 15 contacts the front surface 58 of the stud 50. The first flange 15 and the second horizontal edge 20 fit in the space defined by the side walls 54 and 56 and their associated lips 55 and 57. Therefore, in the embodiment illustrated in FIG. 1A, the width of the elongated base 12 is at a maximum slightly less than the distance separating the ends of the lips 55 and 57 in the plane of the base 52.

In the embodiment shown in FIG. 1A, the end 28 of the front plate 26 extends past the second end 16 of the elongated base 12, while the end 30 of front plate 26 terminates at a position short of the end 14 of the elongated base 12. As shown in the embodiment in FIG. 1A, end 30 of front plate 26 terminates along a portion of the notch 34. As is clear from FIG. 1A, the ends 14 and 16 of the elongated base 12 have different configurations to allow attachment of the mounting bracket to metal studs as discussed above. The ends 28 and 30 overlap the sides 56 of the studs 50. The front plate 26 may be secured to the sides 56 by such as by using a nail gun, screw gun or various other means as is known in the art. In one embodiment, self-tapping screws 49 are inserted through the pre-formed holes 27 on the front plate 26 and into the sides 56 of studs 50. In this manner, the mounting bracket 10 is secured to the studs by the first 15 and second 17 flanges and the face plate 26.

FIG. 2 illustrates an alternate embodiment of the mounting bracket 10. FIG. 2 illustrates the placement of the mounting bracket 10 between two adjacent wood studs 50A which are mounted in a building, typically at uniform spaced intervals as dictated by building codes (such as on 16 or 24 inch centers). In this embodiment, the mounting bracket 10 is formed from 16, 20 or 24 gauge galvanized steel. Unlike the metal studs 50 described above, wood studs 50A are symmetrical in nature and have a front surface 58A, a back surface 60A and two sides 54A and 56A. Since the wood studs 50A are symmetrical, the mounting bracket 10 is attached in a slightly different manner than described in FIG. 1A and the ends 14 and 16 of the elongated base 12 have a slightly different configuration than that shown in FIG. 1A.

As above, the mounting bracket 10 spans the distance between the back surface 60A of one stud 50A and the front surface 58A of the other stud 50A. As shown in FIG. 2, the first end 14 abuts the back surface 58A of stud 50A so that the first flange 15 is in contact with the back surface 58A and the second end 18 abuts the front surface 60A of the stud 50A such that the second flange 17 is in contact with the front surface 60A. The first 15 and second 17 flanges are then secured to the studs 50A as described, such as by using a nail gun, screw gun or various other means as is known in the art (such as screws 49A). In contrast to the embodiment of the mounting bracket illustrated in FIG. 1A, the front plate 26 extends past both the ends 14 and 16 of the elongated base 12 and overlap the sides 56A of the wooden stud 50A. The front plate 26 may be secured to the sides 56A of the studs 50 as describes for the flanges above.

FIG. 3 shows yet another alternate embodiment of the mounting bracket 10. FIG. 3 illustrates the placement of the mounting bracket 10 between two adjacent metal studs 50 as described above. The metal studs 50 have the structure as described above and the mounting bracket 10 is secured to the metal studs 50 as described above. In the embodiment shown in FIG. 3, the front plate 26 does not extend to the ends 14 or 16 of the elongated base 12 and does not contact the sides 56 of the studs 50.

FIG. 4 illustrates yet another alternate embodiment of the mounting bracket 10 showing the bracket 10 being mounted between two metal studs where the back portions 60 of the studs 50 face opposite directions and the sides 54 and 56, with associated lips 55 and 57, face one another. In order to secure the mounting bracket to metal studs 50 arranged in this configuration, two notches 34 are place on the mounting bracket along the first horizontal edge 18 at ends 14 and 16. As shown in FIG. 4, the lips 57 and sides 56 of the studs 50 extend into notches 34 on the elongated base 12 so that the first flange 15 and the second flange 17 contact the front surfaces 58 of the studs 50. The face plate 26 is also shown secured to the sides 56 of the studs 50, with the attachment accomplished as described above.

The mounting bracket 10 with integral electrical box 100 is used as is known in the art after installation. As mounted between a pair of studs 50 or other supports as described herein, utilities are run from their point of origin to the point of delivery into the buildings such that the utilities can be used for their intended purpose. The utility may terminate at the electrical box 100. Alternatively, the utility may enter a first electrical box 100 and be connected to an article and then continue on to a second electrical box for connection to a second article. The mounting bracket 10 with integral electrical box 100 allows for either configuration. Depending on the point of origin of the utility and the placement of the mounting bracket 10, the utility will approach the integral electrical box from a variety of directions. The elongated base 12 of the mounting bracket is provided with a pre-formed hole 11 as described above to allow the passage of the utility through the mounting bracket 10 as may be required. The electrical box 100 also has a series of punch-outs 114 that can be removed to allow entry and/or exit of the utility from the electrical box 100. The punch-outs 114 are positioned at a variety of locations on the electrical box 100 as is standard in the art. As the utility enters or exits the mounting bracket 10 and electrical box 100, the utility may be secured to the channel 24 of the elongated base 12 by the retention clips 13 as described. This will prevent the utility from coming into contact with unintended portions of the mounting bracket 10 and will prevent the application of unwanted or unintended stress being applied to the utility that may damage the utility or cause it to become disconnected with the article contained in the electrical box 100. The use of retention clips 13, however, is optional.

The placement of the mounting bracket 10 at a desired location between the studs 50 allows the positioning of the electrical box 100 at a desired location. The design of mounting bracket 10 removes the need for the installer to make on site adjustments to the mounting bracket. As the mounting bracket 10 comprises an integral electrical box 100, the need to install the electrical box 100 at the job site is obviated, saving both time and expense. The design of the mounting bracket 10 ensures that the electrical box is placed in a position such that the edges of the electrical box are in the proper relationship (such as a parallel relationship) to the wall structures, the floor, the ceiling and window and door frames, ensuring an aesthetically pleasing appearance of the finished installation (i.e., the presentation of the article to be connected to the electrical box). Furthermore, the mounting bracket 10 is secured permanently in place as described herein ensuring that the electrical box will not move out of position when an article is installed in the electrical box and further ensuring that the electrical box will not move out of position over time as the article installed in the electrical box is used (for example, the insertion and removal of an electrical plug into an electrical outlet).

In addition to providing a permanent and secure mounting for an electrical box with the advantages discussed above, the mounting bracket of the present disclosure provides for other useful features. The mounting bracket comprises a one piece front plate to permanently secure the electrical box to the mounting bracket. In addition to securing the electrical box in place, the front plate serves to provide closure between the studs of the wall structure, thereby forming a fire stop or draft dampener. In addition, the mounting bracket 10 is manufactured from a rigid, high strength material and provides substantial bracing and structural support to the studs and the wall structure itself. Therefore, the mounting bracket described performs multiple functions heretofore not available in one device.

The invention claimed is:

1. A mounting bracket for attachment to a pair of supports, said mounting bracket comprising:
   a. An elongated base member, said base member comprising a first end and a second end and a first horizontal edge and a second horizontal edge extending between said first end and said second end;
   b. a first flange in communication with said first end and extending along at least a portion of said first end and a second flange in communication with said second end and extending along at least a portion of said first end, said first and second flanges being in a generally perpendicular relationship to said base member;

c. a rear flange in communication with said second horizontal edge, said rear flange extending along at least a portion of said second horizontal edge;

d. a face plate in communication with said first horizontal edge, said face plate extending along at least a portion of said first horizontal edge, said face plate comprising an electrical box, the electrical box adapted to receive a utility and an article; and e. at least one of said first end or second end incorporates a notch, said notch located at a position selected from the group consisting of: the first horizontal edge and the second horizontal edge, said notch extending in a horizontal direction along the base member.

2. The bracket of claim 1 wherein both the first end of said bracket incorporates a first notch and the second end of said bracket incorporates a second notch, said first notch and second notch located at a position selected from the group consisting of: the first horizontal edge and the second horizontal edge, said first notch and said second notch extending in a horizontal direction along the base member.

3. The bracket of claim 1 where the base member has a length, said length being determined by the distance between said pair of supports.

4. The bracket of claim 1 where the bracket is manufactured from a rigid, high-strength material.

5. The bracket of claim 4 where the metal is galvanized steel.

6. The bracket of claim 1 where the bracket is manufactured from a material selected from the group consisting of: a metal, a plastic, a polymer and a composite.

7. The bracket of claim 1 where said electrical box is formed as an integral part of the face plate.

8. The bracket of claim 1 where the face plate comprises an opening therein and the electrical box is secured in said opening with at least one weld.

9. The bracket of claim 1 where the face plate comprises an opening therein and said opening has at least one flange portion associated therewith and the electrical box is secured in said opening by attachment to said at least one flange.

10. The bracket of claim 1 where the electrical box comprises a plurality of punchouts.

11. The bracket of claim 1 where the article is selected from the group consisting of a light switch, a convenience plug, an electrical outlet, a cable outlet and a phone outlet, said article being capable of connection to the utility.

12. The bracket of claim 1 where the base member further comprises at least one retaining clip to secure the utility.

13. The bracket of claim 1 where the base member further comprises a pre-formed opening to allow passage of the utility through the base member.

14. The bracket of claim 1 where said pair of supports are a first and a second metal stud, and each stud comprises a U-shaped channel formed by a central base having a front side and a back side, two side portions extending outwardly at right angles from the front side of said central base with each of said side portions having a lip portion extending outwardly from said side portions in the same plane as said central base and into said U-shaped channel.

15. The bracket of claim 14 where the front side of the central base of the first metal stud faces the back side of the central base of the second metal stud.

16. The bracket of claim 15 where the notch is located on the first end of said base member and receives one of the side portions and lip portions of the first metal stud so that the first end of the bracket is received in the U-shaped channel of the first metal stud and the first flange on the first end contacts the front side of the central base of the first metal stud.

17. The bracket of claim 16 where notch has a length and a width, said length selected from the group consisting of 2 inches, 2.5 inches and 3 inches, and said width selected from the group consisting of 0.3 inches, 0.5 inches and 0.75 inches.

18. The bracket of claim 16 where the second flange on the second end contacts the back side of the central base of the second metal stud.

19. The bracket of claim 18 where the face plate comprises a first end and a second end and the face plate has a length such that the first end of the face plate contacts one of the side portions of the first metal stud and the second end of the face plate contacts one of the side portions of the second metal stud.

20. The bracket of claim 19 where the first flange is attached to the front side of the central base of the first metal stud, the second flange is attached to the back side of the central base of the second metal stud, the first end of the face plate is attached to one of the side portions of the first metal stud and the second end of the face plate is attached to one of the side portions of the second metal stud.

21. The bracket of claim 18 where the face plate comprises a first end and a second end and the face plate has a length such that neither the first end or the second end of the face plate contacts a side portion of the first or second metal studs.

22. The bracket of claim 21 where the first flange is attached to the front side of the central base of the first metal stud and the second flange is attached to the back side of the central base of the second metal stud.

23. The bracket of claim 14 where the front side of the central base of the first metal stud faces the front side of the central base of the second metal stud.

24. The bracket of claim 23 comprising a first notch and a second notch and the first notch is located on the first end of said base member and receives one of the side portions and lip portions of the first metal stud so that the first end of the bracket is received in the U-shaped channel of the first metal stud and the first flange on the first end contacts the front side of the central base of the first metal stud and the second notch is located on the second end of said base member and receives one of the side portions and lip portions of the second metal stud so that the second end of the bracket is received in the U-shaped channel of the second metal stud and the second flange on the second end contacts the front side of the central base of the second metal stud.

25. The bracket of claim 24 where the first notch and the second notch each have a length and a width, said length selected from the group consisting of 2 inches, 2.5 inches and 3 inches, and said width selected from the group consisting of 0.3 inches, 0.5 inches and 0.75 inches.

26. The bracket of claim 24 where the face plate comprises a first end and a second end and the face plate has a length such that the first end of the face plate contacts one of the side portions of the first metal stud and the second end of the face plate contacts one of the side portions of the second metal stud.

27. The bracket of claim 26 where the first flange is attached to the front side of the central base of the first metal stud, the second flange is attached to the back side of the central base of the second metal stud, the first end of the face plate is attached to one of the side portions of the first metal stud and the second end of the face plate is attached to one of the side portions of the second metal stud.

28. The bracket of claim 24 where the face plate comprises a first end and a second end and the face plate has a length such that neither the first end or the second end of the face plate contacts a side of the first or second metal studs.

29. The bracket of claim 28 where the first flange is attached to the front side of the central base of the first metal stud and the second flange is attached to the back side of the central base of the second metal stud.

30. The bracket of claim 1 where said pair of supports are a first and a second wooden stud, and each stud comprises a front side and a back side, and two side portions joining said front side and back side.

31. The bracket of claim 30 where the first flange on the first end contacts the front side of the first wooden stud and the second flange on the second end contacts the back side of the second wooden stud.

32. The bracket of claim 31 where the face plate comprises a first end and a second end and the face plate has a length such that the first end of the face plate contacts one of the side portions of the first wooden stud and the second end of the face plate contacts one of the side portions of the wooden metal stud.

33. The bracket of claim 32 where the first flange is attached to the front side of the first wooden stud, the second flange is attached to the back side of the second wooden stud, the first end of the face plate is attached to one of the side portions of the first wooden stud and the second end of the face plate is attached to one of the side portions of the second wooden stud.

34. The bracket of claim 31 where the face plate comprises a first end and a second end and the face plate has a length such that neither the first end or the second end of the face plate contacts a side portion of the first or second wooden studs.

35. The bracket of claim 34 where the first flange is attached to the front side of the first wooden stud and the second flange is attached to the back side of the second wooden stud.

* * * * *